United States Patent Office 2,916,328
Patented Dec. 8, 1959

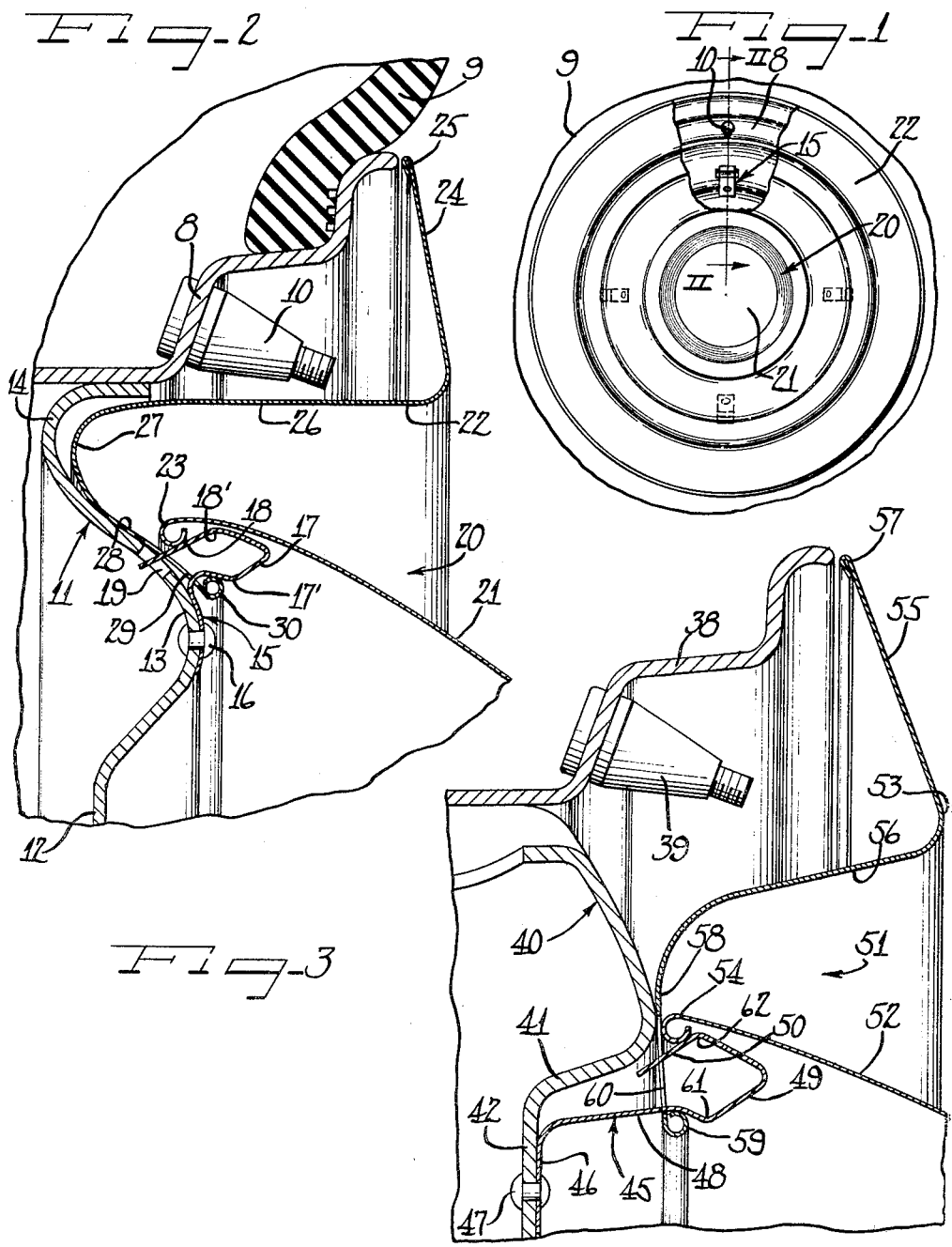

2,916,328

WHEEL COVER

George Albert Lyon, Detroit, Mich.

Application June 2, 1955, Serial No. 512,787

1 Claim. (Cl. 301—37)

This invention relates to a wheel structure and more particularly to a multi-part wheel cover assembly and novel retaining means therefor.

An object of this invention is to provide a multi-part cover assembly with novelly arranged cover retaining spring clips carried by the wheel for retaining cooperation in a novel way with each of the cover parts.

Another object of this invention is to provide a multi-part cover assembly including a trim ring and a hub cap concentric therewith and arranged for overlapping cooperation with retaining means that will engage contemporaneously adjoining edges on both of the cover parts.

In accordance with the general features of this invention, there is provided in a wheel cover structure including a wheel having a multi-flange tire rim, a body part and spring clips projecting axially outwardly from the body part each with oppositely facing shoulders on confronting legs thereof, a wheel cover assembly comprising an outer trim ring apertured at its inner edge portion so that the clips project therethrough with one shoulder of each clip engaged with the inner edge of the ring and a central cover member in overlapping relation with the inner edge of the trim ring and having a turned outer edge snapped into retaining engagement with the other shoulder of each of the clips.

Other objects and features of this invention may more fully appear from the following detailed description taken in connection with the accompanying drawings which illustrate several embodiments thereof and in which—

Figure 1 is a side view of a wheel structure embodying a wheel cover assembly of this invention and with a portion of the assembly broken away to expose a clip;

Figure 2 is an enlarged fragmentary cross-sectional view taken on substantially the line II—II of Figure 1 looking in the direction indicated by the arrows; and Figure 3 is a fragmentary cross-sectional view similar to Figure 2 of a modified form of assembly.

As shown on the drawings:

The reference character 8 designates generally a multi-flange drop-center type of tire rim on which is mounted in the usual way a tire 9 which may be either of the tubeless or tube type. Projecting from a flange of the rim 8 is a conventional valve stem 10.

The rim 8 is carried upon a dished wheel body 11 which may be made in the form of a metallic stamping. The body 11 includes an inset central bolt-on flange 12 by means of which the wheel may be fastened in the customary way on the axle of a vehicle. The body part 12 includes a central bulge or nose portion 13 and a radially outer depressed marginal portion 14 fastened to the base flange of the wheel rim.

Secured to the dished nose portion 13 of the body part are a plurality of spaced gooseneck spring clips 15, each of which is fastened by one or more rivets 16 to the nose portion 13.

Each clip includes an angular or shouldered gooseneck 17 leading into a rearwardly turned angular or shoulder inclined leg 18 which projects inwardly through an aperture 19 in the body part 13 to the inboard side of a wheel. In other words, each gooseneck clip 15 has confronting oppositely facing angular shoulders at 17' and 18'. As shall be seen hereinafter, each shoulder retainingly cooperates with a separate part of the cover assembly 20.

The cover assembly 20 includes a central cover member or hub cap 21 and an outer annular trim ring 22 disposed so as to substantially cover the exposed flanges of the tire rim 8. These two cover parts 21 and 22 comprise relatively deeply dished metallic stampings and may be very economically manufactured on press equipment from sheet steel such as stainless steel strip. The hub cap 21 has a turned continuous outer springy edge 23 adapted to be snapped over the hump 18' of each of the spring clips 15 into retaining engagement therewith.

The trim ring 21 is of an angular cross-section and includes a substantially flat radial portion 24 terminating in a turned reinforced pry-off edge 25. Extending at right angles to portion 24 is an axial portion 26 leading into a curved inner portion 27 adapted to fit into the channeled portion 14 of the body part in telescoping relationship therewith and also to bottom against the body part when on the wheel. The portion 27 has an inner margin 28 terminating in a turned edge 30 adjacent to which are a series of apertures 29 corresponding in number to the number of clips 15 and wheel body apertures 19. These apertures 29 are of a size so that both angular legs of each clip can project freely therethrough to cooperate with the hub cap edge 23 and with the trim ring edge 30 when the assembly 20 is on the wheel.

In the application of the cover assembly to the wheel, the trim ring 22 is first placed over the wheel rim 8 and is then pushed axially into the body part 11 until the shoulder 17' of the gooseneck clips 15 pass through the ring apertures 29 into retaining engagement with the edge 30. Thereafter, the hub cap 21 is pressed over the radially outer legs of the spring clips until its turned edge 23 is behind the angular shoulder 18' of each of the clips. It will be appreciated that when in this position both parts are resiliently held on the wheel by the tensioned spring clips.

In removing the assembly 20, the end of a pry-off tool is first inserted under the turned edge 23 of the hub cap 21 and the hub cap is forcibly ejected from the wheel. Thereafter, the trim ring 22 may be removed by the insertion of the edge of a pry-off tool under the turned edge 25 of the trim ring.

The modification of Figure 3 is very similar to the form shown in Figure 2. It includes a flanged tire rim 38 having a valve stem 39. The rim 38 is carried by a slightly differently shaped dished body part 40 including a dished or inwardly bulged center portion 41 terminating in a bolt-on flange 42. The flange 42 has secured to it a plurality of gooseneck shaped spring clips 45 each having an angular leg 46 fastened by a rivet 47 to the bolt-on flange 42 of the body part. A generally axially outwardly extending leg 48 extends from the leg 46.

Each clip 45 is similar in function and operation to that of the previously described clips 15. A free end of each clip is formed into a double shouldered portion 49 leading into an inclined rear terminal portion 50.

The cover assembly 51 comprises a central hub cap 52 and an annular trim ring 53 made of sheet metal. The two parts, as in the preferred form, are concentric and are spaced to permit access to the turned outer edge 54 of the hub cap when it is desired to pry it free of the wheel. The outer trim ring is of angular cross section and includes a generally radially flat portion 55 and an axial portion 56. The outer edge of the cover is turned at 57 to provide a reinforced pry-off edge. The axial ring portion 56 leads into an apertured marginal portion 58 terminating in inner turned edge 59. This marginal portion 58 is provided with a series of apertures 60 corresponding in number to the number of clips 45 and each of a size to permit the humped extremity 49 of the clip to pass therethrough. The two angular shoulders 61 and 62 of the humped clip 45 cooperate with the edges 59 and 54, respectively, of the trim ring 53 and the hub cap 52 in substantially the same manner as in the first mentioned form.

The spacing of the outer edge 25—57 of both forms of trim ring from the wheel enables air to circulate through such spacing as well as enables each assembly to accommodate better allowable manufacturing variation in the location of the tire rim with respect to the wheel body part.

It will be understood that modifications and variations may be effected without departing from the scope of the novel concepts of the present invention.

I claim as my invention:

In a wheel cover structure including a wheel having a multi-flanged tire rim and a dished body part with the body part having an attachment portion connected to the tire rim and with an annular grooved portion on the body part radially opposite the connection between the tire rim and dished body part with the attachment portion comprising a side wall of the grooved portion, and spring clips disposed on and projecting axially outwardly from the body part each with oppositely facing shoulders on confronting legs thereof, a wheel cover assembly comprising an outer trim ring having an outer intermediate axially inwardly extending ring portion extending into said annular groove, which outer intermediate ring portion has a curved portion at its axially inner area and with the curved portion terminating in a radially inwardly axially outwardly extending inner apertured edge portion spaced radially of the outer intermediate ring portion, said clips projecting through the aperture in the edge portion with one shoulder of each clip engaged with the inner edge of the ring, and a central cover member in overlapping relation with the inner edge of the trim ring and having a cover portion confronting and spaced radially from said intermediate ring portion and axially of said curved portion and terminating in a turned outer edge snapped into retaining engagement with the outer shoulder of each of said clips.

References Cited in the file of this patent

UNITED STATES PATENTS

| | | |
|---|---|---|
| 2,401,492 | Lyon | June 4, 1946 |
| 2,493,003 | Lyon | Jan. 3, 1950 |
| 2,598,705 | Lyon | June 3, 1952 |